United States Patent
Ichikawa

(10) Patent No.: US 11,847,364 B2
(45) Date of Patent: Dec. 19, 2023

(54) SERVER AND NON-TRANSITORY STORAGE MEDIUM STORING INSTRUCTIONS EXECUTABLE BY INFORMATION PROCESSING APPARATUS

(71) Applicant: BROTHER KOGYO KABUSHIKI KAISHA, Nagoya (JP)

(72) Inventor: Yushi Ichikawa, Minamichita-cho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 31 days.

(21) Appl. No.: 17/495,241

(22) Filed: Oct. 6, 2021

(65) Prior Publication Data

US 2022/0113919 A1    Apr. 14, 2022

(30) Foreign Application Priority Data

Oct. 8, 2020 (JP) .................... 2020-170318

(51) Int. Cl.
*G06F 3/12* (2006.01)
*G06F 8/61* (2018.01)

(52) U.S. Cl.
CPC .......... *G06F 3/1225* (2013.01); *G06F 3/122* (2013.01); *G06F 3/1204* (2013.01); *G06F 3/1207* (2013.01); *G06F 3/1239* (2013.01); *G06F 3/1257* (2013.01); *G06F 3/1259* (2013.01); *G06F 8/61* (2013.01)

(58) Field of Classification Search
None
See application file for complete search history.

(56) References Cited

U.S. PATENT DOCUMENTS

| 2006/0152749 | A1* | 7/2006 | Oh .................... G06F 3/1207 358/1.13 |
| 2010/0253975 | A1 | 10/2010 | Ida et al. |
| 2020/0099819 | A1* | 3/2020 | Shiraki .............. H04N 1/33346 |
| 2021/0132938 | A1* | 5/2021 | Ogura ................ H04L 67/34 |

FOREIGN PATENT DOCUMENTS

| JP | 2002057832 A | * | 2/2002 |
| JP | 2010-244550 A | | 10/2010 |
| JP | 2015-022673 A | | 2/2015 |
| JP | 2018133638 A | * | 8/2018 |
| JP | 2019133393 A | * | 8/2019 |
| JP | 2020073332 A | * | 5/2020 |

* cited by examiner

*Primary Examiner* — Fan Zhang
(74) *Attorney, Agent, or Firm* — Scully, Scott, Murphy & Presser, PC

(57) ABSTRACT

A server includes a communication interface, a memory in which a shared folder accessible from an external device is provided, and a controller. The controller is configured to receive a designation of the shared folder through a user interface of the information processing apparatus, install a setting file on the information processing apparatus, and store a path of the designated shared folder into the setting file.

15 Claims, 9 Drawing Sheets

ID
SERVER AND NON-TRANSITORY STORAGE MEDIUM STORING INSTRUCTIONS EXECUTABLE BY INFORMATION PROCESSING APPARATUS

CROSS REFERENCE TO RELATED APPLICATION

The present application claims priority from Japanese Patent Application No. 2020-170318, which was filed on Oct. 8, 2020, the disclosure of which is herein incorporated by reference in its entirety.

BACKGROUND

The following disclosure relates to a server and a non-transitory storage medium storing a plurality of instructions.

There has been a conventional printing system comprising a server configured to connect to printers and clients. The server is provided with a shared folder and stores print data transmitted from the clients in the shared folder. The printers access the shared folder of the server and print the print data received from the shared folder.

Similarly, there has been known a network printing system comprising a print server which stores print data into another folder when the print server receives the print data from terminal devices. When printers access the server, the printer server transmits the print data to the printer that has requested.

SUMMARY

In the above mentioned printing system, in a case where the print data is not transmitted to the printer and the print data is remained in a memory of the server for a long period of time, the remained print data causes a shortage of memory spaces of a memory of the server. The print data has highly confidentiality, and a high level of safety of the print data is required. The print data remained in the memory of the server causes the great risk of leaks, and it is not preferable in view of the safety of the print data.

An aspect of the disclosure relates to a technique reducing a shortage of memory spaces of the memory of the server and increasing a level of safety of print data in the printing system comprising the server connected to the printers and the clients.

In one aspect of the disclosure, a server includes a communication interface, a memory in which a shared folder accessible from an external device is provided, and a controller. The controller is configured to receive a designation of the shared folder through a user interface of the information processing apparatus, install a setting file on the information processing apparatus, and store a path of the designated shared folder into the setting file.

In another aspect of the disclosure, a non-transitory storage medium stores a plurality of instructions readable by a computer of an information processing apparatus. When executed by the computer, the plurality of instructions cause the information processing apparatus to receive a designation of a shared folder that is accessible from an external device through a user interface of the information processing apparatus, install a setting file on the information processing apparatus, and store a path of the designated shared folder into the setting file.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

There will be described a printing system according to a present embodiment with reference to the drawings. The present embodiment is the printing system making a printer to execute printing by a personal computer ("PC" which will be described below).

Configuration Of Printing System

Figure 1:
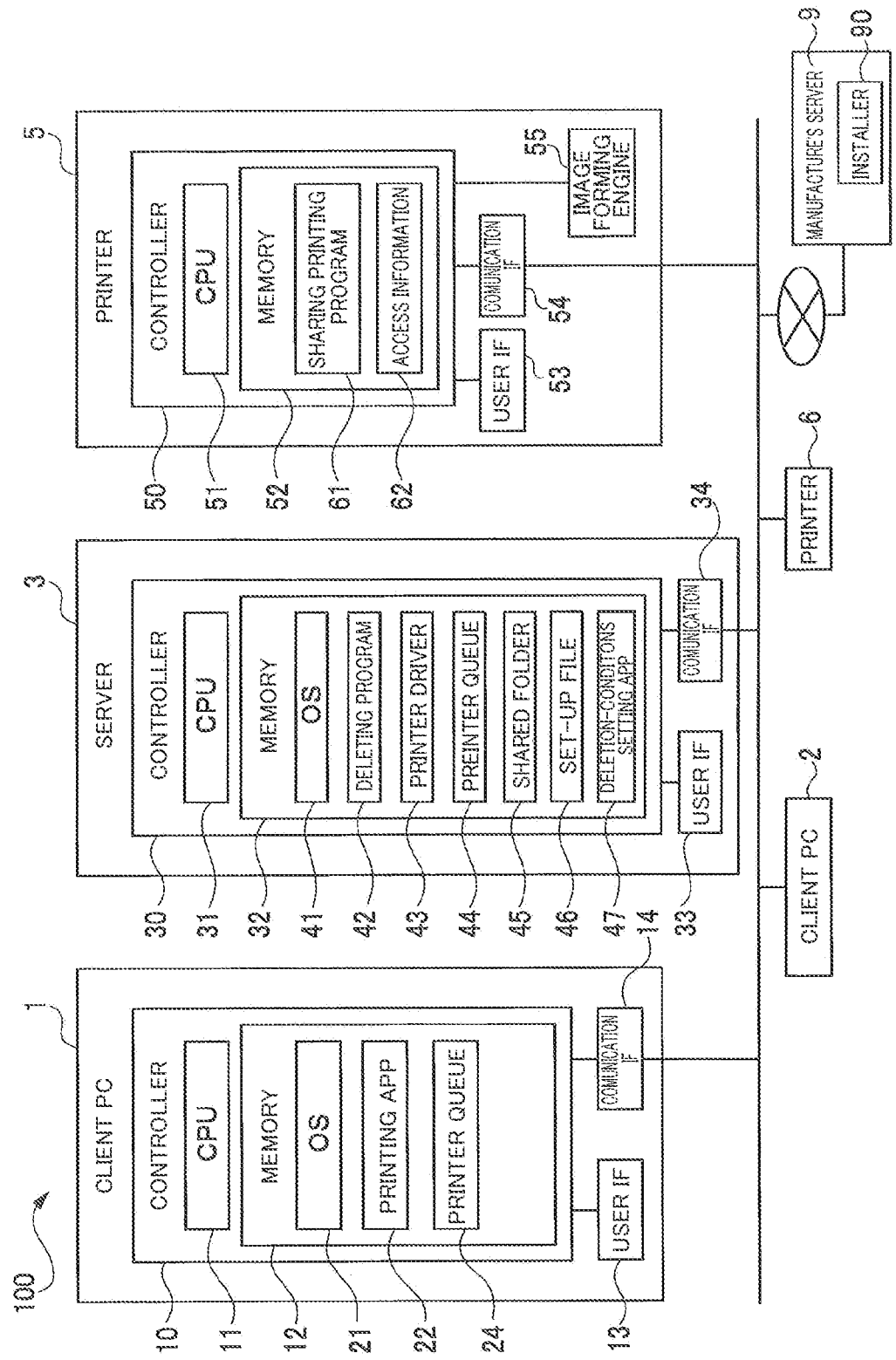
FIG. 1 is a block diagram illustrating an electrical configuration of a printing system of a present embodiment.

As illustrated in FIG. 1, a printing system 100 according to the present embodiment includes a plurality of client PCs 1, 2, a server 3, and a plurality of printers 5, 6. The client PCs 1, 2 are examples of client devices, and the server 3 is an example of a server. Each of the client PCs 1, 2 and the server 3 are connected so as to be communicatable with each other. The server 3 and each of the printers 5, 6 are connected so as to be communicatable with each other. Each of the client PCs 1, 2 and each of the printers 5, 6 may be communicatable or not be communicatable with each other.

The client PC 1 and the client PC 2 according to the present embodiment are the same devices each configured to execute the same operations and processes. The client PC 1 will be explained below on behalf of the client PCs 1, 2. The printer 5 and the printer 6 according to the present embodiment are the same model each configured to execute the same operations and processes. The printer 5 will be explained below on behalf of the printer 5, 6.

The client PC 1 of the present embodiment is a device having at least a receiving function of receiving an printing instruction by a user operation, and a communication function. As illustrated in FIG. 1, the client PC 1 comprises a controller 10 including a CPU 11 and a memory 12. The client PC 1 comprises a user interface 13 ("user IF" which will be described below) and a communication interface ("communication IF" which will be described below), and the user IF 13 and the communication IF 14 are electrically connected to the controller 10. It is noted that the controller 10 illustrated in FIG. 1 and controllers of other devices which will be described below are general terms including hardware and software used in control of the client PC 1, and so on, and do not always represent single hardware that actually exists on the client PC 1, and so on.

The CPU 11 executes various kinds of processes in accordance with programs read from the memory 12 or based on user operations. The memory 12 is a storage area in which various programs such as activation programs for activating the client PC 1 and various application programs ("application" or "app" which will be described below) for utilizing the printers 5, 6, and various data such as image data and document data. The memory 12 is also used as a working area in which various processes are executed.

Examples of the memory 12 or memories of devices are not limited to ROMs, RAMs and HDDs built in devices, and may be a storage medium readable and writable by the CPU 11. The storage medium readable by a computer is a non-transitory medium. The non-transitory medium further includes a recording medium such as CD-ROMs, DVD-ROMs, and so on. The non-transitory medium is also a tangible medium. In contrast, an electrical signal configured to carry programs downloaded from server on the Internet is a kind of medium readable by a computer, however, the electrical signal is not included in the non-transitory storage medium readable by a computer.

The user IF 13 includes hardware configured to display a screen for notifying information to a user and hardware configured to receive a user operation. It is noted that the user IF 13 may be a touch screen having both a display function and an operation receiving function, or a pair of a display having a display function and a keyboard, a mouse, or trackball, and the like, having an operation receiving function.

The communication IF 14 includes hardware configured to communicate with external devices, such as the server 3. A communication standard of the communication IF 14 is Ethernet (registered trademark), Wi-Fi (registered trademark), and so on. A communication type of the communication IF 14 may be wired communication or wireless communication.

As illustrated in FIG. 1, the memory 12 of the client PC 1 stores various program and various data including an operating system ("OS" which will be described below) 21, a printing application 22 and a printer queue 24. The OS 21 is, for example, WINDOWS (registered trademark), however, the OS 21 may be another OS having the same architecture.

The printing application 22 is an application configured to generate or edit, for example, document data and image data, and configured to receive an printing instruction by a user. The OS 21 has a generating function of generating intermediate data for causing the printers 5, 6 to execute printing. The intermediate data is data representing an image to be printed and intermediate data that is generated in the process of generating the print data from image data, such as PDL (Page Description Language) data, that is handled by the printing application 22. The intermediate data is data on which rendering has not been performed, and is not print data used in printing without being processed. The printer queue 24 is an interface configured to receive and transmit the intermediate data.

It is noted that the printer queue 24 of the present embodiment is allocated to a shared printer corresponding to the printers 5, 6 by a function of the OS 21. The intermediate data that has been transmitted to the printer queue 24 is transmitted to the server 3 through the communication IF 14 by the OS 21. The shared printer is a printer queue 44 open to a network by a function of an OS 41 of the server 3, which will be described below. In the following embodiment, a printer corresponding to the printer queue open to a network may be described by "the shared printer" for the sake of convenience.

The server 3 of the present embodiment is a device having at least a storage function of storing the print data and a communication function. As illustrated in FIG. 1, the server 3 comprises a controller 30 including a CPU 31 and a memory 32. The CPU 31 is an example of a controller or a computer. The server 3 comprises a user IF 33 and a communication IF 34, and the user IF 33 and the communication IF 34 are electrically connected to the controller 30. The server 3 has the same electrical configurations as the client PC 1 explained above.

As illustrated in FIG. 1, the memory 32 of the server 3 stores various programs and various data including the OS 41, a deleting program 42, a printer driver 43, the printer queue 44, the shared folder 45, a set-up file 46, and a deletion-conditions setting application 47. The OS 41 is, for example, WINDOWS (registered trademark), however, the OS 41 may be another OS having the same architecture.

The printer driver 43 is a program configured to generate the print data available for the printers 5, 6 by rendering the intermediate data. The printer queue 44 is an interface configured to receive and transmit the intermediate data and the print data. In the present embodiment, the OS 41 receives the intermediate data transmitted from the client PCs 1, 2, and the intermediate data is transmitted to the printer queue 44 by the OS 41. Moreover, the intermediate data that has been transmitted to the printer queue 44 is transmitted to the printer driver 43. The printer driver 43 generates the print data that is available for printing by the printer 5 by rendering the received intermediate data, and stores the generated print data into the shared folder 45.

The shared folder 45 is a folder open to a network by a function of the OS 41. The shared folder 45 is a folder accessible from external devices other than the server 3, such as the client PCs 1, 2 and the printers 5, 6, and so on. Administrative privileges are set for the shared folder 45.

Figure 2:
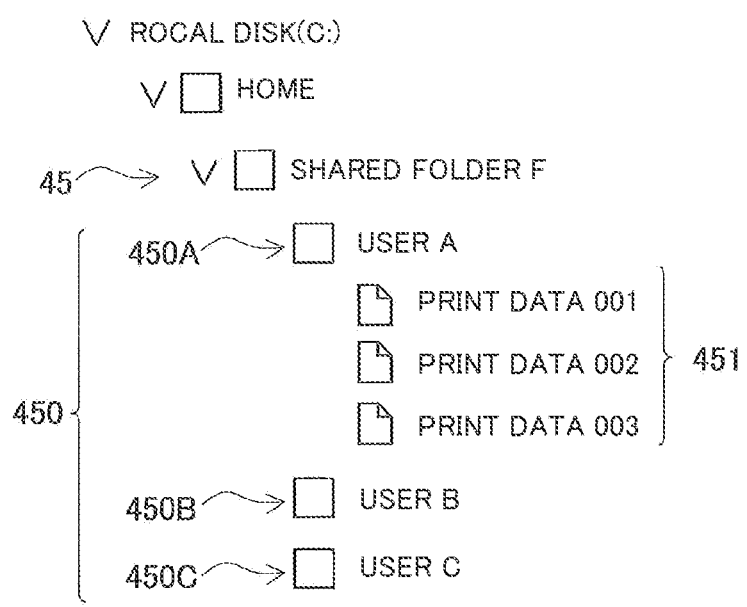
FIG. 2 is a view of a configuration of a shared folder.

As illustrated in FIG. 2, a plurality of individual folders 450, each of which is for each user, are provided at the lower hierarchical level of the shared folder 45. For example, each of an individual folder 450A corresponding to a user A, an individual folder 450B corresponding to a user B, and an individual folder 450C corresponding to a user C is provided at the lower hierarchical level of the shared folder 45. A folder name of each of the plurality of individual folders 450 includes a user ID, and the folder name is associated with the user ID. Access privileges are set for each of the plurality of individual folders 450. The user to which the administrative privileges have been set is accessible to all of the plurality of individual folders 450 and all of files provided at the lower hierarchical level of the shared folder 45. The user to which the administrative privileges have not been set is only accessible to the individual folder 450 including the user's own ID. Since the access privileges of accessing to the shared folder 45 is not set to the user who is not allowed to use the printing system 100, the user cannot access any of the plurality of individual folders 450 provided at the lower hierarchical level of the shared folder 45. In the following description, "the shared folder 45" includes the plurality of individual folders 450 provided at the lower hierarchical level of the shared folder 45. For example, "files stored in the shared folder 45" include files stored in the plurality of individual folders 450, for example, the print data 451 stored in the individual folder 450A in addition to files stored at a directly lower hierarchical level of the shared folder 45.

The deleting program 42 is a program configured to delete print data, which is satisfying predetermined deletion conditions, of a plurality of pieces of print data stored in the shared folder 45. The deleting program 42 is a resident program, and the deleting program 42 is stated by the OS 41 when the server 3 starts up. The deletion-conditions setting application 47 is a program configured to set the deletion conditions used by the deleting program 42. The deletion-conditions setting application 47 is an example of a deletion-conditions setting program. For example, in the present embodiment, a timing for execution of deletion of the print data is set by the deletion-conditions setting application 47 as the deletion conditions, and the print data is deleted by the deleting program 42 at the timing set by the deletion-conditions setting application 47.

The set-up file 46 stores a path of the shared folder 45 and the deletion conditions used by the deleting program 42. The set-up file 46 is an example of a setting file. The set-up file 46 is referred or read when the printer driver 43 and the deleting program 42 access to the shared folder 45. The set-up file 46 is stored at a lower hierarchical level of a particular folder to which administrative privileges are set. The printer driver 43 impersonates system privileges to access the particular folder. Since the deleting program 42 and the deletion-conditions setting application 47 start under the administrative privileges, the deleting program 42 and the deletion-conditions setting application 47 can access to the set-up file 46.

The printer 5 of the present embodiment is a device shared by a plurality of users, and has at least a printing function of printing images based on print data and a communication function. As illustrated in FIG. 1, the printer 5 comprises a controller 50 including a CPU 51 and a memory 52. The printer 5 comprises a user IF 53, a communication IF 54 and an image-forming engine 55, and the user IF 53, the communication IF 54 and the image-forming engine 55 are connected to the controller 50. The memory 52 of the printer 5 stores various programs and various data including a sharing printing program 61 and access information 62. The access information 62 is information for accessing to the server 3, and is account information having access privileges accessible to the shared folder 45.

The printing system 100 of the present embodiment is connected to a server 9 of a manufacture of the printer 5 through an external network such as the Internet. The server 9 of the manufacture stores an installer 90 configured to install the printer driver 43, the deleting program 42, and so on. The installer 90 is an example of a plurality of instructions. The server 3 downloads the installer 90 and executes an installing process when the server 3 installs the printer driver 43, the deleting program 42, and so on. It is noted that the server 9 of the manufacture may be connected to the server 3 while the server 3 downloads the installer 90, and may be or may not be connected to the server 3 while the server 3 manages the printing system 100. The installer 90 may be provided to the server 3 stored in portable devices such as CD-ROM, and so on.

Printing Steps by Shared Printer

There will be next described an overview of a sequence of steps of causing the shared printer such as the printer 5 to execute printing by using the client PC 1 with reference to a sequence diagram. In the following description, a first sequence of steps of instructing the client PC 1 to print and a second sequence of steps of causing the printer 5 to execute printing in this order. It is noted that the sequence of steps executed in the client PC 1 is executed by the CPU 11 of the client PC 1, the sequence of steps executed in the server 3 is executed by the CPU 31 of the server 3, and the sequence of steps executed in the printer 5 is executed by the CPU 51 of the printer 5.

Figure 3:
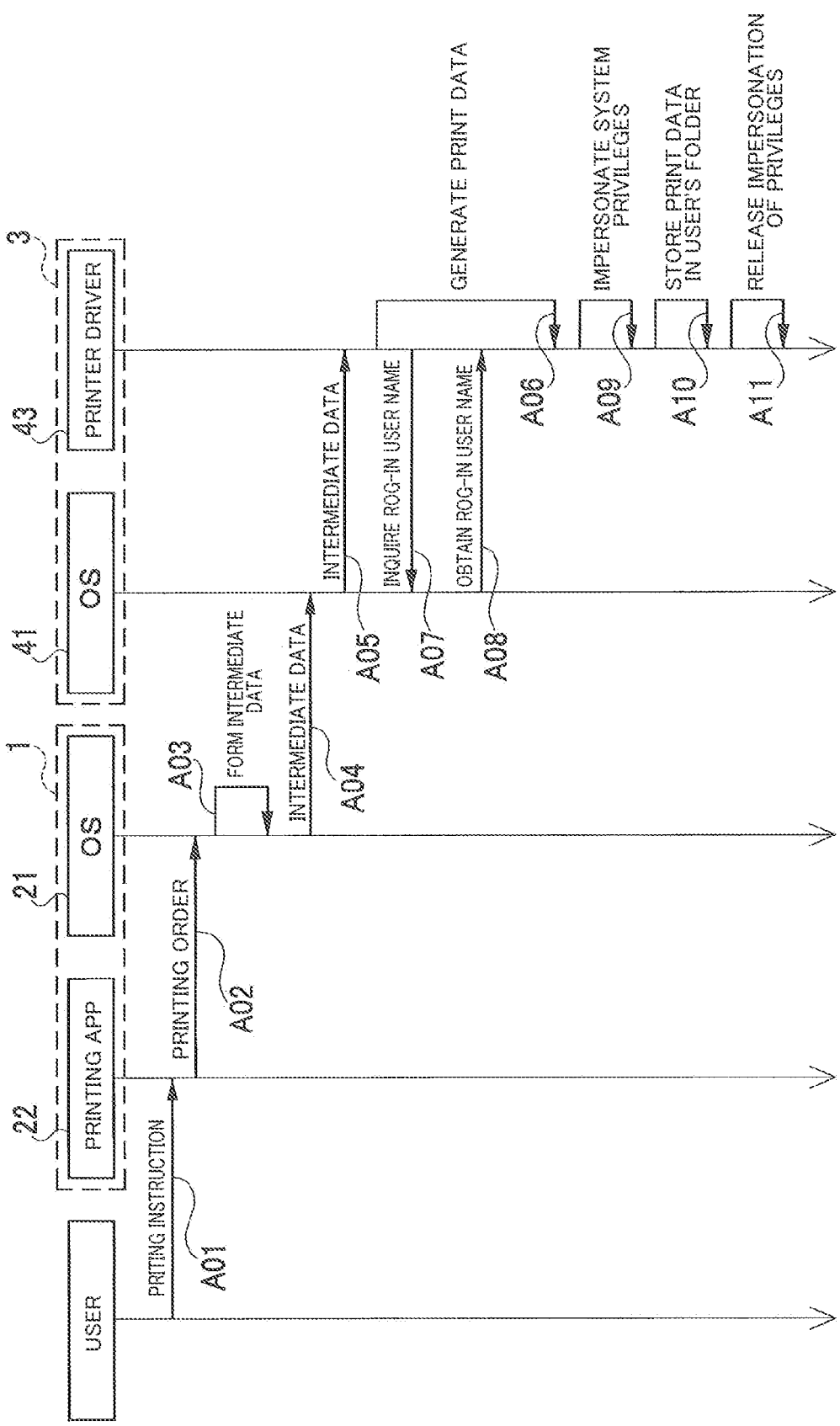
FIG. 3 is a view illustrating a sequence diagram of a first sequence of steps of storing print data into the shared folder.

There will be first described an overview of the first sequence of steps with reference to FIG. 3. In the first sequence of steps, a user logs in to the client PC 1, and instructs the client PC 1 to execute printing by the printing application 22, and so on at A01. The user instructs the client PC 1 to execute printing by designating a printer queue registered in the OS 21 through the printing application 22, and so on.

The printing application 22 transmits a printing order to the OS 21 based on the received printing instruction at A02. The printing order includes image data representing images to be printed and parameters related to printing.

The OS 21 generates the intermediate data based on the received printing order by, for example, GDI (Graphic Device Interface) at A03. Then, the OS 21 transmits the generated intermediate data to the server 3 through an interface of the printer queue 24 at A04.

The OS 41 of the server 3 receives the intermediate data from the client PC 1. In the server 3, the printer driver 43 starts to generate print data based on the intermediate data received by the OS 41 at A06. In the present embodiment, since the data received by the server 3 is the intermediate data, and the data has not been rendered, the received intermediate data is transmitted to the printer driver 43 (A05).

When generating print data, the printer driver 43 inquires of the OS 41 log-in information of the client PC 1 that has transmitted the intermediate data at A07. The log-in information includes information of a user ID or a user name indicating a user who is logging in the client PC 1. The printer driver 43 obtains the information of the user ID or the user name from the OS 41 at A08. The printer driver 43 generates print data by rendering the intermediate data, and introduces or enters the information of the user ID or the user name obtained from the OS 41 into the generated print data. In the present embodiment, the printer driver 43 introduces the user name into the print data.

The printer driver 43 impersonates the system privileges (A09). When the printer driver 43 starts processes in response to receipt of the intermediate data, the printer driver 43 operates under privileges of the user ID of the intermediate data. Accordingly, at A09, the printer driver 43 of the present embodiment temporary withdraws a present account, and impersonates the system privileges by using information previously included in the OS 41.

Moreover, the printer driver 43 obtains the path of the shared folder 45 by referring the set-up file 46, and specifies the individual folder 450A, corresponding to the user name obtained at A08, of the plurality of individual folders 450. The printer driver 43 stores the print data generated by rendering the intermediate data at A06 into the specified individual folder 450A of the plurality of individual folders 450 of the shared folder 45 at A10. The printer driver 43 can store the print data into any of the plurality of individual folders 450 by impersonating the system privileges. The printer driver 43 can create a new individual folder 450 by impersonating the system privileges, when there is no individual folder 450 corresponding to the user. With is configuration, the print data corresponding to images specified by the printing instruction received by the client PC 1 is stored into the individual folder 450 corresponding to the user who has instructed the PC 1 to print. After storing the print data into the shared folder 45, the printer driver 43 returns the original account by releasing impersonation of the privileges at A11.

Figure 4:
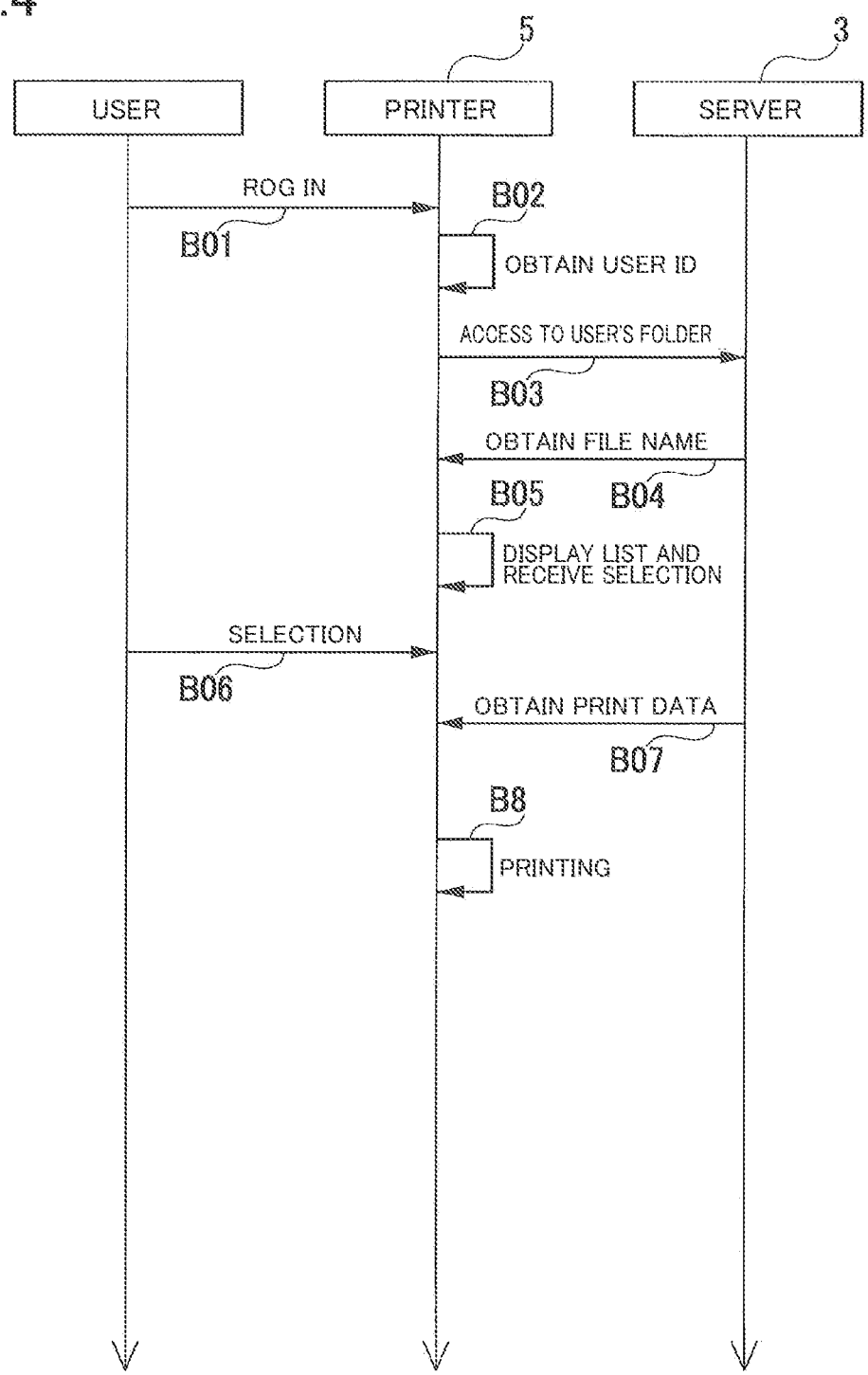
FIG. 4 is a view illustrating a sequence diagram of a second sequence of steps of printing based on the stored print data.

There will be next described an overview of the second sequence of the steps with reference to FIG. 4. In the second sequence of steps, the user inputs log-in information including the user ID to the printer 5, and logs in to the printer 5 at B01. The printer 5 executes a log-in authorization based on the inputted log-in information. The log-in authorization may be executed based on the user information being stored in the printer 5 itself, and may be executed by an authorizing server shared by the server 3 and the client PC 1. When the log-in authorization to the printer 5 is not successful, the printer 5 does not execute a sharing printing process by the sharing printing program.

When the log-in authorization to the printer 5 is successful, the printer 5 executes the sharing printing process by the sharing printing program 61. The printer 5 obtains the user ID of the user who has logged in based on the inputted log-in information at B02.

Then, the printer 5 retrieves the access information 62, and accesses to, by using the obtained user ID, the individual folder 450, which corresponds to the user name specified by the obtained user ID, of the plurality of individual folders 450 respectively corresponding to users at B03. Since the plurality of individual folders 450 store the print data of respective users, the CPU 51 can easily determine the folder which stores the print data of the log-in user.

The printer 5 obtains file names of all of the print data stored in the individual folder 450 that has been accessed at B04. Then, the printer 5 displays a list of the obtained file names on the user IF 53, and receives a selection by the user at B05.

The user selects a file name of the print data, which is to be printed, among the displayed list of file names through the user IF 53 at B06. The printer 5 obtains the print data corresponding to the selected file name from the server 3 at B07. It is possible to reduce a burden of the memory 52 of the printer 5 by obtaining only the selected print data.

The printer 5 executed printing by the image-forming engine 55 based on the obtained print data at B08. When the printing is completed, the printer 5 deletes the print data obtained from the server 3. The printer 5 may transmit, to the server 3, a deleting instruction of deleting the print data in the server 3.

It is noted that the printer 5 may receive selections of a plurality of file names among the displayed list of file names When the plurality of files are selected, the printer 5 executes processes of B07 and B08 in order for all of the selected files.

Setting Steps by Deletion Conditions Setting Application

There will be next described a sequence of steps of processes according to the deleting program 42 and the deletion-conditions setting application 47 each installed on the server 3 with reference to flowcharts. It is noted that each of processes and each of steps of processes described below basically indicate processes of the CPU 31 and so on in accordance with instructions described in the program. That is, processes of "to decide", "to extract", "to select", "to calculate", "to determine", "to specify", "to obtain", "to receive", "to control", and so on indicate processes of the CPU 31 and the like. The processes of the CPU 31 and the like include hardware control by using an API of the OS of the server 3. In the present disclosure, operations of each of the programs will be described below without referring to the OS. That is, in the following disclosure, a description to the effect that "a program B controls hardware C" may indicate "a program B controls hardware C by using an API of the OS". In some cases, processes of the CPU 31 and the like in accordance with instructions described in the programs may be described in simplified wording. For example, there may be a description "the CPU 31 executes". Moreover, processes of the CPU 31 and the like in accordance with instructions described in the programs may be described by a description "the program A executes", without referring to the CPU.

It is noted that "to obtain" will be used in a concept that the request is not essential. That is, processes of receiving data without being requested by the CPU 11 is also included in a concept that "the CPU 11 obtains data". "Data" in the present disclosure is represented by a bit string readable by a computer. Then, data having substantially the same contents in a different format will be dealt with as the identical data. The same applies to "information" in the present disclosure. Moreover, "to request" and "to instruct" are concepts that information indicating the request and information indicating the instruction are output to the other party. The information indicating the request and the information indicating instruction may be described merely as "request" and "instruction".

Furthermore, processes of determining whether information A indicates that it is a matter B by the CPU 11 may be conceptually described such as "whether it is the matter B or not is determined from the information A". Processes of determining whether information A indicates that it is a matter B or a matter C may be conceptually described such as "whether it is the matter B or the matter C is determined from the information A".

Figure 5:
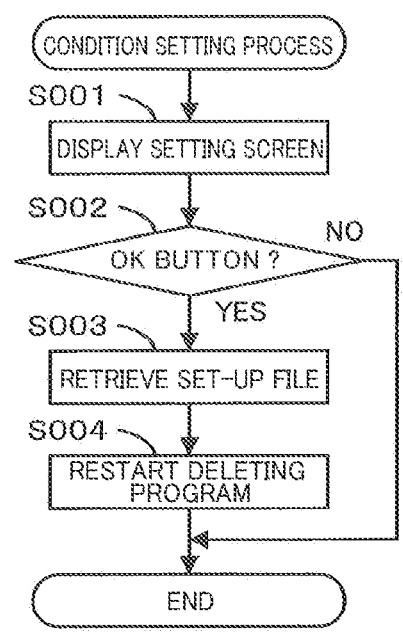
FIG. 5 is a flowchart representing a deletion-conditions setting process by a deletion-conditions setting application.

There will be first described a sequence of a condition setting process that is a process executed by the deletion-conditions setting application 47 with reference to a flowchart in FIG. 5. The deletion-conditions setting application 47 is started when an instruction for starting from the printer driver 43 or a direct instruction for starting from a user is input to the server 3. The condition setting process is executed by the CPU 31 of the server 3 when the deletion-conditions setting application 47 is started.

Figure 6:
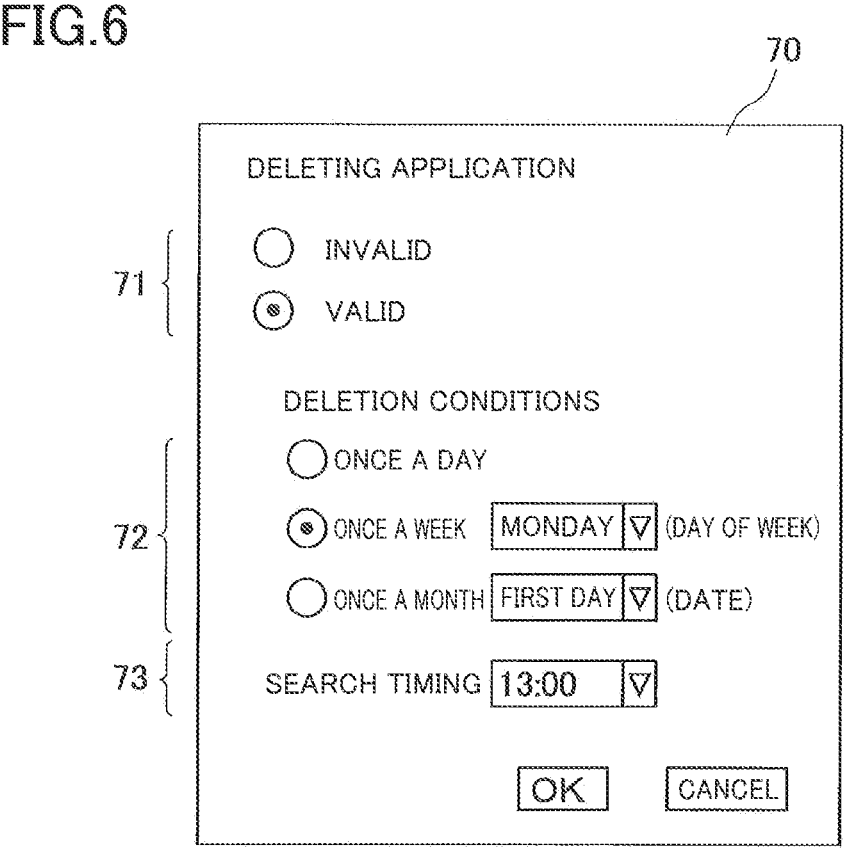
FIG. 6 is a view for explaining an example of a setting screen for the deletion-conditions setting process displayed by the deletion-conditions setting application.

In the condition setting process, first, the CPU 31 display a deletion-conditions setting screen 70 illustrated in FIG. 6 on the user IF 33 at S001. The deletion-conditions setting screen 70 includes, as the deletion conditions, an item 71 for setting whether automatic deletion for print data by the deleting program 42 is "VALID" or "INVALID", an item 72 for setting intervals of executions of the automatic deletion, and an item 73 for setting an execution time of the automatic deletion. A content of setting of each of the item 72 and the item 73 becomes valid when "VALID" is selected in the item 71, and the automatic deletion of print data by the deleting program 42 is not executed when "INVALID" is selected in the item 71. In the item 72, the intervals of executions of the automatic deletion is alternatively selectable among "ONCE A DAY", "ONCE A WEEK" and "ONCE A MONTH", and a selection for "DAY OF WEEK" becomes selectable when the "ONCE A WEEK" is selected as the intervals of execution of the automatic deletion, and a selection for "DATE" becomes selectable when the "ONCE A MONTH" is selected as the intervals of execution of the automatic deletion. In the item 73, a time for execution of the automatic deletion can be designated in ten minutes increments. That is, the time for deleting the print data is set by the item 72 and the item 73.

Then, the CPU 31 determines whether an OK button or a CANCEL button on the deletion-conditions setting screen 70 is selected at S002. When it is determined that the OK button is selected (S002:YES), the CPU 31 writes, into the set-up file 46, a content being selected on the deletion-conditions setting screen 70 as the deletion conditions at S003. For example, regarding each of items 71, 72 and 73 displayed on the deletion-conditions setting screen 70, when "VALID" is selected as the item 71, "MONDAY" of "ONCE A WEEK" is selected as the item 72, and "13:00" is selected as item 73, the time of the automatic deletion is every Monday at 1:00 p.m.

Even when a deletion condition has been written into the set-up file 46, the deleting program 42 needs to be automatically restarted such that the deleting program 42 reflects the written deletion condition. Accordingly, after S003, the CPU 31 restarts the deleting program 42 at S004. It is noted that the CPU 31 may restart the server 3 at S004. By restarting the deleting program 42 automatically, it is possible to reduce a burden on the user. After S004, or it is determined that the ON button is not selected, that is, the cancel button is selected (S002:NO), the CPU 31 ends the deletion condition process, and the deletion-conditions setting application 47 also ends. Since the deletion conditions, used in the deleting program 42, are set by the deletion-conditions setting application 47 through the user IF 33, it is easy for the user to set the deletion conditions of the print data.

Deletion Steps by Deleting Program

Figure 7:
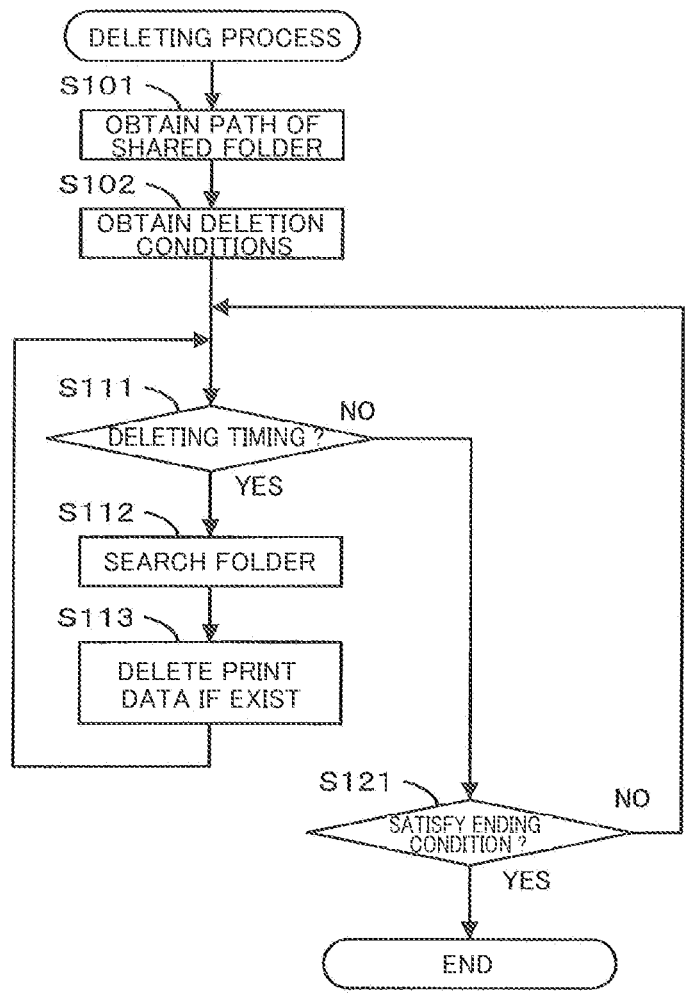
FIG. 7 is a flowchart representing a deleting process by a deleting program.

There will be next described a sequence of a deleting process that is a process executed by the deleting program 42 with reference to FIG. 7. The deleting program 42 is started by the OS 41 when the server 3 is started, and operates as a resident program having administrative privileges. The deleting process is executed by the CPU 31 of the server 3 when the deleting program 42 is started.

In the deleting process, first, the CPU 31 retrieves the set-up file 46, and obtains a path of the shared folder 45 stored in the set-up file 46 at S101. The set-up file 46 is stored in a particular folder that is predetermined in advance, and the deleting program 42 retrieves the set-up file 46 by accessing to the particular folder. Moreover, the CPU 31 obtains the deletion conditions stored in the set-up file 46 at S102.

After obtaining the path of the shared folder 45 and the deletion conditions, the CPU 31 determines whether the time for the automatic deletion set by the deletion conditions comes or not at S111. The time of execution of the automatic deletion can be set by the deletion conditions. For example, when the deletion intervals are once a day, and the time for the automatic deletion is 1:00 p.m., the CPU 31 determines whether it becomes one o'clock p.m. Alternatively, for example, when the deletion intervals are every Monday and the time for the automatic deletion is 1:00 p.m., the CPU 31 determines whether it becomes one o'clock on Monday. For example, when the deletion intervals are the first day of the month and the time for the automatic deletion is 1:00 p.m., the CPU 31 determines whether it becomes one o'clock in the first day of the month.

When the time for the automatic deletion comes (S11: YES), the CPU 31 searches for the print data, which is to be deleted, in the shared folder 45 at S112 and deletes the print data when the print data exists at S113. That is, the CPU 31 searches for the print data in each of the plurality of individual folders 450 and deletes the stored print data such that it becomes a situation in which the print data to be deleted is not being stored in the plurality of individual folders 450. Returning to S111 after S113, the CPU 31 waits for the time for the automatic deletion. As a result of this, a content of the individual folder 450 becomes empty in accordance with the deletion conditions, it is possible to prevent the print data to be deleted from being stored in the server 3 for a long period of time. It is noted that in a case where INVALID is set to the deletion conditions, the CPU 31 does not set the time for automatic deletion so as to invalidate the automatic deletion by the deleting program 42.

By contrast, when the time for the automatic deletion does not come (S111:NO), the CPU 31 determines whether a ending condition is satisfied at S121. The ending condition includes an instruction for ending the deleting program 42. When the ending condition is satisfied (S121:YES), the CPU 31 ends the deleting process and ends the deleting program 42. When the ending condition is not satisfied (S121:NO), the flow returns to S111, and the CPU 31 waits for the time for the automatic deletion or the instruction for ending.

Installing Steps by Installer

Figure 8:
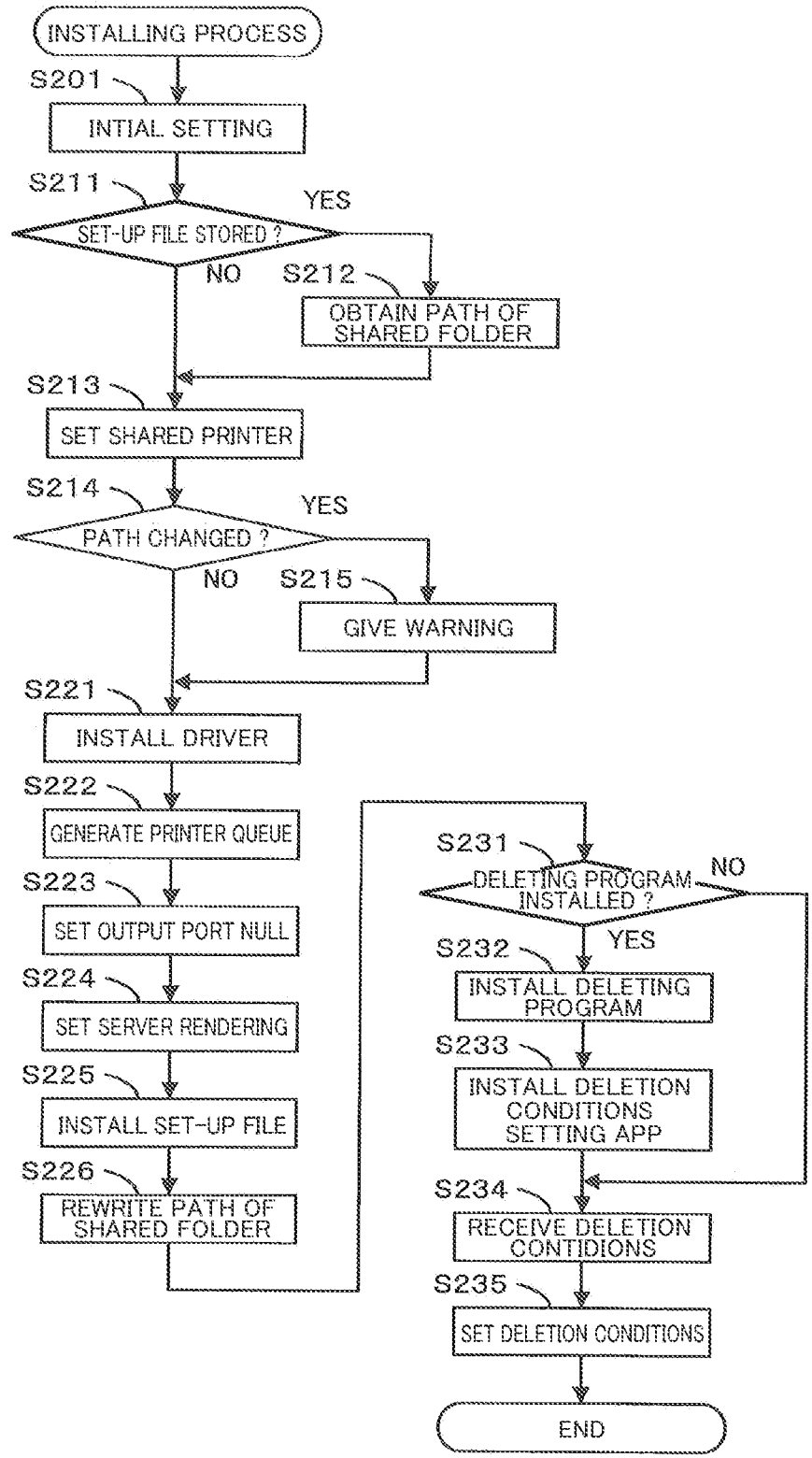
FIG. 8 is a flowchart representing an installing process by an installer.

There will be next described a sequence of steps of an installing process that is a process executed by the installer 90 with reference with a flowchart in FIG. 8. After being downloaded from the server 9 of a manufacture, the installer 90 is started by a direct instruction for starting from a user. The installing process is executed by the CPU 31 of the server 3 when the installer 90 is started. The installing process by the installer 90 is an example of an installing process by a plurality of instructions.

In the installing process, first, the CPU 31 executes an initial setting necessary for installing of programs at S201. For example, a setting of language, and a product license agreement correspond to the initial setting. The installer 90 is available for a plurality of modes of printers, and in a case where it is necessary to specify a model of printer, the CPU 31 receives the model of the printer. Moreover, in a case where a spooler service has been started, installing of a printer driver cannot be executed, accordingly, the CPU 31 gives a warning in which the installing of the printer driver cannot be executed during operation of the spooler service, and end the installing process.

After S201, the CPU 31 determines whether the set-up file 46 is stored in the memory 32, that is, whether the set-up file 46 has been installed on the server 3 at S211. When it is determined that the set-up file 46 is stored in the memory 32 (S211:YES), the CPU 31 retrieves the set-up file 46 that has been installed on the server 3 and obtains the path of the shared folder 45 at S212.

Figure 9:
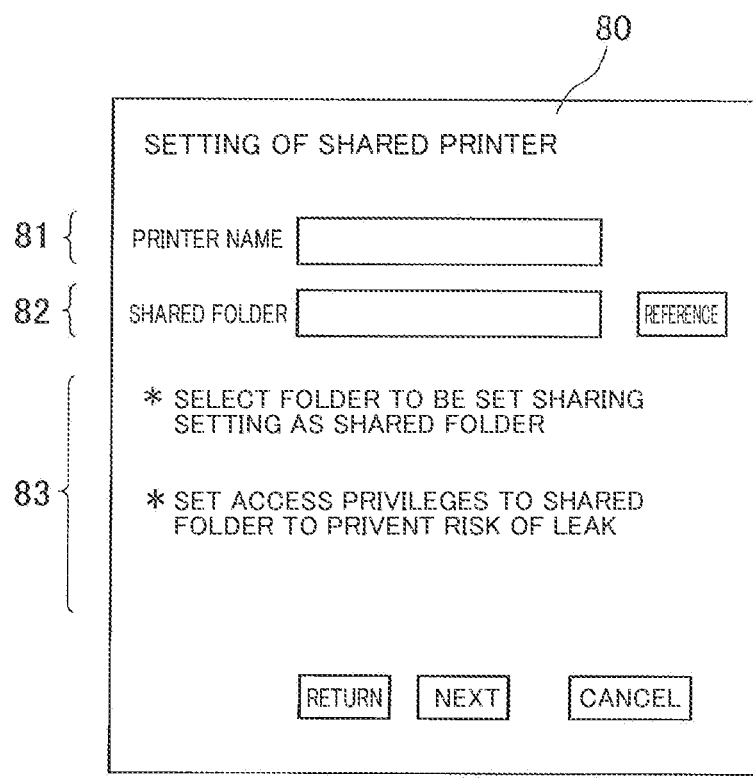
FIG. 9 is a view for explaining an example of a setting screen for a shared printer displayed by the installer.

After S212, or when it is determined that the set-up file 46 is not stored in the memory 32 (S211:NO), the CPU 31 executes setting of the shared printer at S213. Specifically, at S213, the CPU 31 displays a shared printer setting screen 80 as illustrated in FIG. 9 on the user IF 33. The shared printer setting screen 80 includes, as necessary items for the setting of the shared printer, an item 81 for inputting a name of the shared printer, an item 82 for inputting the path of the shared folder 45, and an item 83 for indicating precautions with respect to the path set for the shared folder 45.

When the CPU 31 has obtained the path of the shared folder 45 at S212, the CPU 31 displays the obtained path of the shared folder 45 in the item 82 as an initial value, when displaying the shared printer setting screen 80. In a case where the set-up file 46 has already been stored in the memory 32, the shared printer of the present embodiment has been used by the CPU 31 by that time, there is a possibility that the print data exists in the obtained shared folder 45. In this case, if the path of the shared folder 45 is changed, it is difficult to print the print data in the shared folder 45. Accordingly, the CPU 31 initially displays the obtained path of the shared folder 45, and prevents the obtained path of the shared folder 45 from being changed. Moreover, since the CPU 31 displayed the initial value of the path of the shared folder 45, it is possible to omit operations for designating the shared folder 45.

When a path that does not exist in the server 3 is designated in the item 82, the CPU 31 notifies an error indicating an inappropriate path is designated. It is noted that the path of the shared folder 45 may be designated as a starting option of the installer 90. In this case, an input to the item 82 may be omitted. Alternatively, the path designated to the starting option may be displayed as the initial value of the item 82.

The folder operated as the shared folder 45 needs to be set a sharing setting. Since the installer 90 does not set the sharing setting with respect to folders, a user needs to set the sharing setting with respect to the folders by himself. Accordingly, the CPU 31 displays a message on the item 83 and notifies, at least, that the folder selected as the shared folder needs to be set the sharing setting. Moreover, since the shared folder 45 becomes a place in which the print data is stored, it is preferable that the shared folder 45 needs to be set access privileges that restrict a large number of unspecified individuals from accessing to the shared folder 45. Accordingly, the CPU 31 displays the message on the item 83 and notifies that the shared folder 45 is operated under the above mentioned access privileges. It is noted that the notification may be reproduced by a voice guidance in addition to displaying the message on the item 83.

After setting up the setting of the shared printer at S213, the CPU 31 determines whether the path of the shared folder 45 is changed at S214. Specifically, at S214, the CPU 31 determines that the path of the shared folder 45 is changed when the path of the shared folder 45 which is set at S213 is different from the path of the shared folder 45 obtained at S212. The CPU 31 determines that the path of the share folder is not changed when the path of the shared folder 45 which is set at S213 is the same as the path of the shared folder 45 obtained at S212. In a case where an obtainment at S212 is not executed, the CPU 31 determines the path of the shared folder 45 is not changed. When the path of the shared folder 45 is changed (S214:YES), at S215, the CPU 31 gives a warning, by using the user IF 33, there is possibility that the print data cannot be printed. The reason is that the print data has been stored in the previous shared folder that had been designated as the shared folder before the path of the designated shared folder is changed. By notifying in advance, it is possible to reduce the user's confusion caused due to impossibility of printing of the already-stored print data.

After S215, or when the path of the shared folder 45 is not changed (S214:NO), the CPU 31 installs the printer driver 43 on the server 3 at S221. Moreover, at S222, the CPU 31 generates a printer queue of the shared printer by using the name of the printer selected at S213. Then, the CPU 31 sets an output port of the generated printer queue to null at S223. In the present embodiment, since the printer driver 43 stores the print data in the shared folder 45, the CPU 31 sets the output port to null such that the intermediate data and the print data is not output from the printer queue. Moreover, in the printing system 100 of the present embodiment, since the printer driver 43 of the server 3 allocates the print data to the plurality of individual folders 450, the printer driver 43 needs to receive the print data from the printer queue, and the CPU 31 sets a setting in which rendering of the intermediate data is executed on the server 3's side at S224.

The CPU 31 also installs the set-up file 46 on the server 3 at S225. If the set-up file 46 is accidentally deleted or changed, the printer driver 43 and the deleting program 42 cannot execute appropriate processes. For that reason, the CPU 31 sets the administrative privileges to the folder which stores the set-up file 46 to limit access to the set-up file 46, and prevents the accidental deletion or change of the set-up file 46. Then, the CPU 31 writes the path of the shared folder set at S213 with respect to the installed set-up file 46 at S226.

After S226, the CPU 31 determines whether the deleting program 42 needs to be installed at S231. Specifically, at S231, the CPU 31 determines whether the latest version of the deleting program 42 has been stored in the memory 32, that is, whether the latest version of the deleting program 42 has been installed on the server 3. When it is determined that the latest version of the deleting program 42 has not been stored in the memory 32, the CPU 31 determines that the latest version of the deleting program 42 needs to be installed. When it is determined that the latest version of the deleting program 42 has been stored in the memory 32, the CPU 31 determines that the deleting program 32 does not need to be installed. Alternatively, when it is determined that the latest version of the deleting program 42 has been stored in the memory 32, the CPU 31 may inquire of the user whether the deleting program 42 needs to be installed, and may determine whether the deleting program 42 needs to be installed based on a response to the inquiry. Moreover, regardless of whether the deleting program 42 is stored in the memory 42 or not, the CPU 31 may inquire of the user whether the deleting program 42 needs to be installed, and may determine whether the deleting program 42 needs to be installed based on a response to the inquiry. Alternatively, the CPU 31 may determine whether the deleting program 42 needs to be installed based on whether the deleting program 42 is stored in the memory 42 or not, without determining the version of the deleting program 42.

When it is determined that the deleting program 42 needs to be installed (S231:YES), the CPU 31 installs the deleting program 42 on the server 3 at S232. At this time, the CPU 31 installs the deleting program 42 as a service program having administrative privileges in advance. Moreover, the CPU 31 also installs the deletion-conditions setting application 47 in addition to the deleting program 42 at S233.

After S233, or when it is determined that the deleting program 42 does not need to be installed (S231:NO), the CPU 31 receives the deletion conditions through the user IF 33 at S234. The deletion conditions received at S234 are the same as the deletion conditions settable by the deletion-conditions setting application 47. Then, at S235, the CPU 31 writes the deletion conditions received at S234 into the set-up file 46 installed at S225. The CPU 31 may receive and set the deletion conditions by displaying a setting screen, provided by the installer 90, to the user. Alternatively, the CPU 31 may receive and set the deletion conditions by starting the deletion-conditions setting application 47 and causing the deletion-conditions setting application 47 to execute receiving and setting. It is noted that if the deleting program 42 is not installed, the CPU 31 may not set the deletion conditions. Even when the deleting program 42 has been installed, the CPU may not set the deletion conditions. After S235, the CPU 31 ends the processes.

It is noted that, in the installer 90 of the present embodiment, the CPU 31 installs the printer driver 43, the set-up file 46, the deleting program 42, and the deletion-conditions setting application 47 in this order, however, the order of installing is not limited this. For example, the CPU 31 may execute installing of the deleting program 42 before installing of the printer driver 43 and so on. Moreover, in the installer 90 of the present embodiment, the CPU 31 may execute setting of the shared printer after, or in the middle of installing of the printer driver 43 and so on. For example, after the CPU 31 installs the deleting program 42, the CPU 31 may execute setting of the shared printer, and then may execute installing of remaining programs.

As described above, in the server 3 of the present embodiment, regarding the print data stored in the shared folder 45 of the server 3 by the printer driver 43, the deleting program 42 automatically deletes the print data satisfying the deletion conditions. With this configuration, it is possible to prevent the print data that is to be deleted from being stored in the memory 32 of the server 3 for a long period of time without being printed. As a result, a shortage of memory space in the memory 32 of the server 3 is reduced, and a risk of leak of the print data is reduced.

It is to be understood that the present embodiment does not limit the present disclosure and is only one example. Accordingly, this disclosure may be embodied with various changes and further modifications, which may occur to those skilled in the art, without departing from the spirit and scope of the disclosure. For example, a number of devices is not limited to examples illustrated in drawings, but may be any numbers of devices. Moreover, the client PC is not limited to a personal computer (PC), but may be a smartphone, or a tablet computer and so on.

The printer may be a device having a printing function, and may be a multi-functional peripheral (MFP), a copy device, a facsimile device, and so on. The printer may execute a process of sharing printing when, for example, the printer receives a selection of a function to be executed and an instruction for sharing printing. Moreover, the printer may limit executing functions to be executable based on the user who has logged in. For example, the printer limits the user who is allowed to use the printer from executing the sharing printing.

In the present embodiment, the deletion conditions are stored in the set-up file 46, the deleting program 42 obtains the deletion conditions from the set-up file 46, and the deletion-conditions setting application 47 stores the deletion conditions into the set-up file 46, however, the deletion conditions may be stored into another file which is different from the set-up file 46. In this case, the deleting program 42 obtains the deletion conditions from said another file, and the deletion-conditions setting application 47 stores the deletion conditions into said another file. Moreover, the installer installs said another file in addition to the set-up file 46. As described in the present embodiment, when the deletion conditions are stored in the set-up file 46, there is no need to provide said another file for storing the deletion conditions, a configuration of the server 3 becomes simple.

In the present embodiment, a searching time constituted by intervals and timing of deleting can be set as the deletion conditions, and the CPU 31 deletes the print data stored in the memory 32 at the timing of the searching time, that is, the CPU 31 deletes the print data at the same time, however, the deletion conditions are not limited to this. For example, a storage period is set to each print data as the deletion conditions, and the deleting program 42 periodically searches for the print data in the shared folder 45. In a case where a length of time having passed from the time when the print data has been generated becomes greater than the storage period, the deleting program 42 may delete the print data, that is, the CPU 31 may individually delete the print data.

Moreover, in the present embodiment, the deleting program 42 resides, however, for example, the deleting program 42 may be periodically started, or started at a predetermined time by the OS 41 or other applications. At the staring time, the deleting program 42 may search for the print data in the shared folder 45 and delete the print data satisfying the deletion conditions.

In the present embodiment, the deleting program 42 deletes the print data, however, the printer driver 43 may delete the print data. In this case, the deleting program 42 may not be installed on the server 3, and the printer driver 43 may search for the print data in the shared folder 45 and delete the print data satisfying the deletion conditions at a timing, for example a timing of generating print data and the like, when the print driver 43 is called by the OS 41.

Moreover, in the installer 90 of the present embodiment, it is determined that the deleting program 42 is installed or not based on selection by the user, however, the deleting program 42 may be automatically installed without selection by the user. In the above described embodiment, however, the user can construct a printing system which does not delete print data when the user selects that the deleting program 42 is not installed. In this case, it is possible to increase flexibility of the printing system provided by the installer 90. Similarly, the printer driver 43 may be installed or not based on selection by the user.

Moreover, in the installer 90 of the present embodiment, when the latest version of the deleting program 42 has been installed, the deleting program 42 is not installed. However, the deleting program 42 may be installed by overwriting. In the above described embodiment, it is possible to prevent unnecessary installing operations because of inexecution of installing the deleting program 42. Similarly, the printer driver 43 may not be installed when the printer driver 43 has been installed.

In the arbitrary flowcharts disclosed in the present embodiment, within a scope in which contents of the plurality of processes do not contradict with each other, an execution order of a plurality of processes in the plurality of arbitrary steps may be changed, and the plurality of processes may be executed in parallel.

The processes disclosed in the embodiment may be executed by a single CPU, a plurality of CPUs, hardware such as ASIC or combinations of them. The processes disclosed in the present embodiment may be realized in various types such as a recording medium recording programs or methods for executing the processes.

What is claimed is:

1. A server, comprising:
  a communication interface;
  a memory in which a shared folder accessible from an external device is provided; and
  a controller configured to:
    receive a designation of the shared folder through a user interface of the server;
    install a setting file on the server; and
    store a path of the designated shared folder into the setting file,
    install, on the server, a printer driver configured to generate print data printable by a printer, the printer driver being accessible to the shared folder; and install, on the server, a deleting program configured to delete print data stored in a memory of the server, the deleting program being accessible to the shared folder and the setting file, wherein, when the server receives a print job including user identification information and intermediate data indicating an image to be printed, the printer driver is configured to:
- generate the print data by rendering the intermediate data included in the received print job; and
- retrieve the path of the shared folder from the setting file; and
- store the generated print data into one of a plurality of individual folders each provided at a lower hierarchical level of the shared folder and each corresponding to the user identification information included in the received print job, wherein the deleting program is configured to:
- retrieve the path of the shared folder from the setting file; and
- delete at least one piece of print data of a plurality of pieces of print data respectively stored in the plurality of individual folders each provided at the lower hierarchical level of the shared folder, the at least one piece of print data satisfying deletion conditions.

2. The server according to claim 1, further comprising a user interface, wherein the controller is configured to install a deletion-condition setting program on the server, the deletion-condition setting program being configured to set the deletion conditions used by the deleting program, wherein the controller is configured, by the deletion-condition setting program, to:
- receive a setting for the deletion conditions through the user interface; and
- store the received setting for the deletion conditions into the memory, and wherein the controller is configured, by the deleting program, to:
- retrieve the deletion conditions from the memory;
- retrieve the path of the shared folder from the setting file; and
- delete the at least one piece of print data of the plurality of pieces of print data respectively stored in the plurality of individual folders each provided at the lower hierarchical level of the shared folder, the one piece of print data satisfying the deletion conditions.

3. The server according to claim 1, wherein the setting file stores the path of the shared folder and the deletion conditions, wherein the controller is configured, by the deleting program, to:
- retrieve the path of the shared folder and the deletion conditions from the setting file; and
- delete the at least one piece of print data of the plurality of pieces of print data respectively stored in the plurality of individual folders each provided at the lower hierarchical level of the shared folder, the one piece of print data satisfying the deletion conditions.

4. A non-transitory storage medium storing a plurality of instructions readable by a computer of an information processing apparatus, wherein, when executed by the computer, the plurality of instructions cause the information processing apparatus to:
- receive a designation of a shared folder that is accessible from an external device through a user interface of the information processing apparatus;
- install a setting file on the information processing apparatus; and
- store in a path of the designated shared folder into the setting,
- install, on the information processing apparatus, a printer driver configured to generate print data printable by a printer, the printer driver being accessible to the shared folder; and
- install, on the information processing apparatus, a deleting program configured to delete print data stored in a memory of the information processing apparatus, the deleting program being accessible to the shared folder and the setting file, wherein, when the information processing apparatus receives a print job including user identification information and intermediate data indicating an image to be printed, the printer driver is configured to:
- generate the print data by rendering the intermediate data included in the received print job; and
- retrieve the path of the shared folder from the setting file; and
- store the generated print data into one of a plurality of individual folders each provided at a lower hierarchical level of the shared folder and each corresponding to the user identification information included in the received print job, wherein the deleting program is configured to:
- retrieve the path of the shared folder from the setting file; and
- delete at least one piece of print data of a plurality of pieces of print data respectively stored in the plurality of individual folders each provided at the lower hierarchical level of the shared folder, the at least one piece of print data satisfying deletion conditions.

5. The non-transitory storage medium according to claim 4, wherein, when executed by the computer, the plurality of instructions cause the information processing apparatus to set access privileges for an administrator on a particular folder in which the setting file is stored.

6. The non-transitory storage medium according to claim 4, wherein, when executed by the computer, the plurality of instructions cause the information processing apparatus to notify through the user interface that the designated shared folder needs to be set to be accessible from the external device.

7. The non-transitory storage medium according to claim 4, wherein, when executed by the computer, the plurality of instructions cause the information processing apparatus to display, as a default setting, the path of the shared folder retrieved from the setting file that has been installed, when the designation of the shared folder is received through the user interface.

8. The non-transitory storage medium according to claim 7, wherein, when executed by the computer, the plurality of instructions cause the information processing apparatus to give a warning through the user interface, when a path of a folder different from the path of the shared holder retrieved from the setting file that has been installed is designated.

9. The non-transitory storage medium according to claim 4,
  wherein, when executed by the computer, the plurality of instructions cause the information processing apparatus to receive a name of the printer and generate a printer queue with the received name of the printer,
  wherein the printer driver is configured to, after the information processing apparatus receives the print job and the received print job has been stockpiled on the printer queue, obtain the intermediate data included in the print job from the printer queue and generate the print data by rendering the obtained intermediate data.

10. The non-transitory storage medium according to claim 9,
  wherein, when executed by the computer, the plurality of instructions cause the information processing apparatus to, after the printer queue has been generated, make a setting to render the print data by the printer driver of the information processing apparatus.

11. The non-transitory storage medium according to claim 9,
  wherein, when executed by the computer, the plurality of instructions cause the information processing apparatus to, after the printer queue has been generated, set an output port of the printer queue to a null port.

12. The non-transitory storage medium according to claim 4,
  wherein, when executed by the computer, the plurality of instructions cause the information processing apparatus to further install a deletion-condition setting program on the information processing apparatus, the deletion-condition setting program being configured to set the deletion conditions used by the deleting program, and
  wherein the deletion-condition setting program is configured to:
    receive a setting for the deletion conditions through the user interface; and
    store the received setting for the deletion conditions into the memory;
  wherein the deleting program is configured to:
    retrieve the deletion conditions from the memory;
    retrieve the path of the shared folder from the setting file; and
    delete the at least one piece of print data of the plurality of pieces of print data respectively stored in the plurality of individual folders each provided at the lower hierarchical level of the shared folder, the one piece of print data satisfying the deletion conditions.

13. The non-transitory storage medium according to claim 4,
  wherein, when executed by the computer, the plurality of instructions cause the information processing apparatus to install the setting file storing the path of the shared folder and the deletion conditions on the information processing apparatus, and
  wherein the deleting program is configured to:
    retrieve the path of the shared folder and the deletion conditions from the setting file; and
    delete the at least one piece of print data of the plurality of pieces of print data respectively stored in the plurality of individual folders each provided at the lower hierarchical level of the shared folder, the one piece of print data satisfying the deletion conditions.

14. The non-transitory storage medium according to claim 4,
  wherein, when executed by the computer, the plurality of instructions cause the information processing apparatus, before the deleting program is installed on the information processing apparatus:
    to receive an input indicating whether the deleting program is to be installed on the information processing apparatus or not;
    to install the deleting program on the information processing apparatus when the received input indicates the deleting program is to be installed; and
    not to install the deleting program on the information processing apparatus when the received input indicates the deleting program is not to be installed.

15. The non-transitory storage medium according to claim 4,
  wherein, when executed by the computer, the plurality of instructions cause the information processing apparatus, before the deleting program is installed on the information processing apparatus:
    to determine whether the latest version of the deleting program has been installed on the information processing apparatus;
    to install the latest version of the deleting program on the information processing apparatus when it is determined that the latest version of the deleting program has not been installed; and
    not to install the latest version of the deleting program on the information processing apparatus when it is determined that the latest version of the deleting program has been installed.

\* \* \* \* \*